(12) United States Patent
Demizu et al.

(10) Patent No.: US 11,588,971 B2
(45) Date of Patent: Feb. 21, 2023

(54) IMAGING APPARATUS WITH TWO OPERATION INTERFACES FOR SETTING IMAGING CONDITIONS

(71) Applicant: Sony Group Corporation, Tokyo (JP)

(72) Inventors: Masaki Demizu, Tokyo (JP); Riuzou Nagatsuka, Tokyo (JP); Hirofumi Morimoto, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/420,297

(22) PCT Filed: Jan. 23, 2020

(86) PCT No.: PCT/JP2020/002254
§ 371 (c)(1),
(2) Date: Jul. 1, 2021

(87) PCT Pub. No.: WO2020/202724
PCT Pub. Date: Oct. 8, 2020

(65) Prior Publication Data
US 2022/0053131 A1    Feb. 17, 2022

(30) Foreign Application Priority Data

Apr. 3, 2019   (JP) .............................. JP2019-071102

(51) Int. Cl.
*H04N 5/232*    (2006.01)
*G03B 17/02*    (2021.01)

(52) U.S. Cl.
CPC ......... *H04N 5/23245* (2013.01); *G03B 17/02* (2013.01); *H04N 5/23212* (2013.01); *H04N 5/232933* (2018.08)

(58) Field of Classification Search
CPC ........... H04N 5/23245; H04N 5/23212; H04N 5/232933; H04N 5/232939; H04N 5/225;
(Continued)

(56) References Cited

U.S. PATENT DOCUMENTS 6,374,052 B1     4/2002   Satoh et al.
2015/0172531 A1*  6/2015   Ikeda ............... H04N 5/232945
                                              348/207.11
(Continued)

FOREIGN PATENT DOCUMENTS

JP       2001-42378 A    2/2001
JP       2004-80478 A    3/2004
(Continued)

OTHER PUBLICATIONS

International Search Report dated Apr. 14, 2020 in PCT/JP2020/002254 filed on Jan. 23, 2020, 2 pages.

*Primary Examiner* — Padma Haliyur
(74) *Attorney, Agent, or Firm* — Oblon, McClelland, Maier & Neustadt, L.L.P.

(57) ABSTRACT

The imaging apparatus according to the present invention includes: a first operation unit having a plurality of buttons corresponding to setting items of imaging conditions, and capable of adjusting the setting items according to operation; and a second operation unit capable of performing a rotating operation and a depressing operation and setting conditions related to the setting items according to operation.

14 Claims, 10 Drawing Sheets

(58) Field of Classification Search
CPC .. H04N 5/23216; H04N 5/2353; H04N 5/238; H04N 5/243; G03B 17/02; G03B 2206/00; G03B 17/561; G06F 3/0362; G06F 3/0482; G06F 3/0484
See application file for complete search history.

(56) References Cited

U.S. PATENT DOCUMENTS

| | | | |
|---|---|---|---|
| 2016/0127645 A1* | 5/2016 | Sudo | H04N 5/232941 348/221.1 |
| 2016/0191800 A1* | 6/2016 | Yoshikawa | H04N 5/23245 348/220.1 |
| 2016/0316139 A1* | 10/2016 | Arai | H04N 5/232935 |
| 2018/0234621 A1* | 8/2018 | Oyama | G06F 3/04847 |
| 2019/0075241 A1* | 3/2019 | Fukushima | H04N 5/232933 |

FOREIGN PATENT DOCUMENTS

| | | |
|---|---|---|
| JP | 2006-191235 A | 7/2006 |
| JP | 2010-183477 A | 8/2010 |

\* cited by examiner

IMAGING APPARATUS WITH TWO OPERATION INTERFACES FOR SETTING IMAGING CONDITIONS

FIELD

The present disclosure relates to an imaging apparatus, a control method, and a program.

BACKGROUND

In general, an imaging apparatus such as a digital video camera automatically or manually changes imaging conditions such as focus and exposure. In order to easily change the imaging conditions, it is important that the imaging apparatus has a user interface that is easy for the user to operate.

As an example of the above imaging apparatus, Patent Literature 1 discloses an imaging apparatus having a first operation means composed of an operation key, a second operation means provided separately from the operation key and outputting two operation signals corresponding to the operation direction, and a control means. When the depression time of the first operation means is less than a predetermined time, the control means executes switching processing between an automatic setting mode and a manual setting mode for a setting item whose setting value is to be changed. Further, the control means changes the setting value of the setting item to be changed according to the operation direction of the second operation means when the mode is switched to the manual setting mode by the switching processing, and displays a selection screen of the setting item to be changed on the display means when the depression time is a predetermined time or longer.

CITATION LIST

Patent Literature

Patent Literature 1: JP 2006-191235 A

SUMMARY

Technical Problem

However, although the imaging apparatus described in Patent Literature 1 can change various imaging conditions by the two operation means, the imaging apparatus requires a complicated operation until the change of the imaging conditions is completed, and has a room for improvement.

Accordingly, the present disclosure proposes an imaging apparatus, a control method, and a program that can change imaging conditions with fewer operation steps.

Solution to Problem

According to the present disclosure, an imaging apparatus is provided that includes: a first operation unit having a plurality of buttons corresponding to setting items of imaging conditions, and capable of adjusting the setting items according to operation; and a second operation unit capable of performing a rotating operation and a depressing operation and setting conditions related to the setting items according to operation.

According to the present disclosure, a control method, by a processor, is provided that includes: being capable of adjusting setting items according to operations of a plurality of buttons corresponding to setting items of imaging conditions; and setting conditions related to the setting items according to operation of a member having a shape capable of performing a rotating operation and a depressing operation.

According to the present disclosure, a program is provided that causes a computer to: allow a plurality of buttons corresponding to setting items of imaging conditions to function as a first operation unit capable of adjusting the setting items according to operation; and allow a member having a shape capable of performing a rotating operation and a depressing operation to function as a second operation unit setting conditions related to the setting items according to operation.

DESCRIPTION OF EMBODIMENTS

Figure 1:
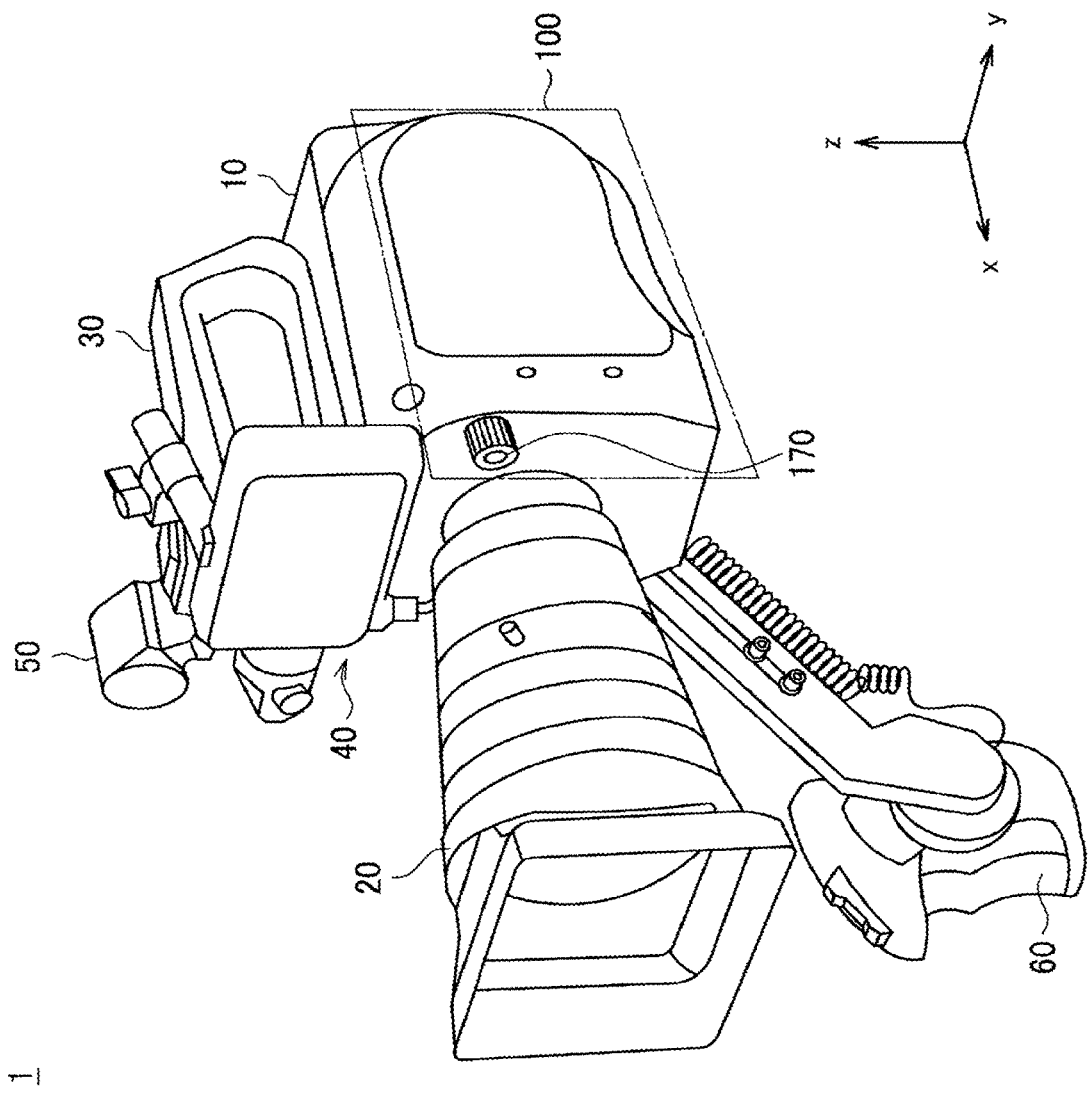
FIG. 1 is a perspective view illustrating an example of an external configuration of an imaging apparatus according to an embodiment.

A preferred embodiment of the present disclosure will now be described in detail with reference to the accompanying drawings. Note that in the present description and the drawings, components having substantially the same functional configuration are denoted by the same reference numerals and redundant description thereof is omitted. Further, the proportions and dimensions of each component in the figures do not represent the actual proportions and dimensions of each component.

The description shall be in the following order:
1. Configuration Example of Imaging Apparatus 1
  1-1. Example of External Configuration
  1-2. Example of Internal Configuration 2. Operation
2-1. Operation Process
2-2. Screen Transition
2-2-1. First Example
2-2-2. Second Example
3. Summary 1. Configuration Example of Imaging Apparatus 1

1-1. Example of External Configuration

Figure 2:
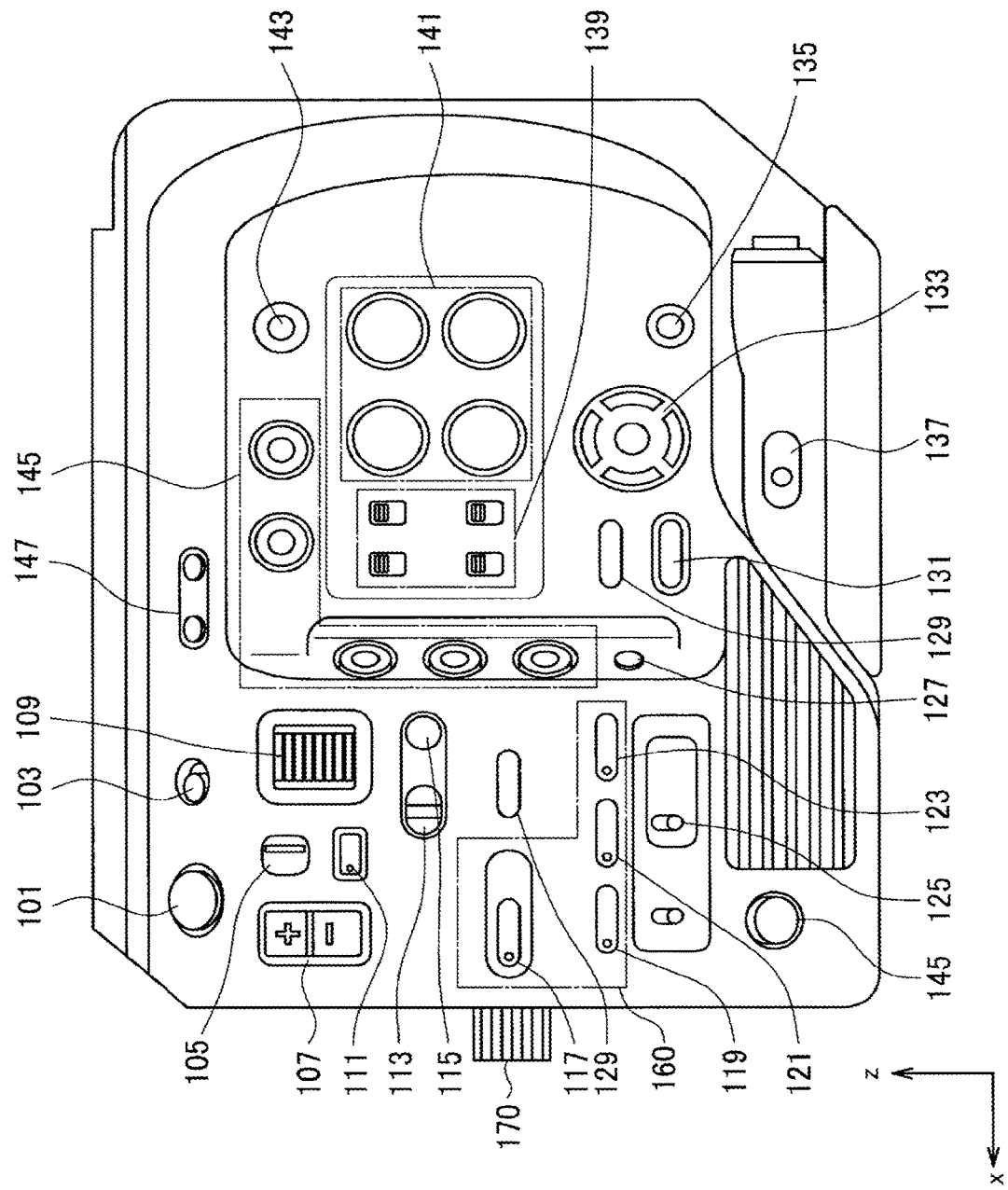
FIG. 2 is a view illustrating an example of an operation panel provided on a side face of the imaging apparatus according to the embodiment.

An example of the external configuration of the imaging apparatus 1 according to the present embodiment will first be described with reference to FIGS. 1 to 6. FIG. 1 is a view illustrating an example of the external configuration of the imaging apparatus according to an embodiment of the present disclosure. FIG. 2 is a view illustrating an example of an adjustment unit 100 provided on a side face of the imaging apparatus according to the present embodiment. FIGS. 3 to 6 are diagrams illustrating examples of screens displayed on a display unit provided in the imaging apparatus according to the present embodiment.

As illustrated in FIG. 1, the imaging apparatus 1 includes a main body 10, an optical system 20, a handle 30, a display unit 40, a microphone holder 50, and a grip remote controller 60. Note that the imaging apparatus 1 illustrated in FIG. 1 is merely an example of the imaging apparatus according to the embodiment of the present disclosure, and the handle 30, the display unit 40, the microphone holder 50, and the grip remote controller 60 are provided as needed and may not necessarily be provided.

(Main Body 10)

The main body 10 images the light condensed by the optical system 20, and records an electric signal obtained by converting the light into electricity as an image signal. The optical system 20 is disposed on a front face (the face on the X-axis positive direction side) of the main body 10, and the adjustment unit 100 is disposed from the front face to the side face (the face on the Y-axis positive direction side) of the main body 10.

The adjustment unit 100 has components such as switches and buttons for performing various operations of the imaging apparatus 1, on the side face of the main body 10. The components such as switches and buttons for performing various multiple operations of the imaging apparatus 1 constitute a first operation unit 160. Further, the adjustment unit 100 has a second operation unit 170, on the front face of the main body 10, which is capable of performing a rotating operation and a depressing operation and sets conditions related to the setting items according to operation.

Specifically, as illustrated in FIG. 2, the adjustment unit 100 may include a recording button 101 for inputting an instruction to start and end recording of a captured image, and a recording hold switch 103 for maintaining a recording state or a recording stop state, on the side face of the main body 10. The adjustment unit 100 may further include an ND filter setting switch 105 for changing the setting mode of an ND filter for adjusting the quantity of light, an ND filter selection switch 107, an ND filter change dial 109, and an ND filter automatic setting button 111, on the side face of the main body 10. The adjustment unit 100 may further include a focus setting mode changeover switch 113, a focus setting button 115, an iris adjustment button 117 for adjusting a position of an iris blade, a gain adjustment button 119 for adjusting a gain, a white balance adjustment button 121 for adjusting a white balance, and a shutter speed adjustment button 123 for adjusting a shutter speed, on the side face of the main body 10. The adjustment unit 100 may further include a preset switch 125 for changing a setting value to a preset setting value, a status button 127 for displaying the state of the imaging apparatus 1 on the display unit 40, and a display button 129 for selecting display or non-display of an icon indicating the state of various settings of the imaging apparatus 1 on the display unit 40, on the side face of the main body 10. The adjustment unit 100 may further include a thumbnail button 131 for displaying on the display unit 40 a thumbnail of a clip recorded on the attached recording medium, a menu button 133 for enabling to change various setting conditions such as reproducing photographed or recorded data, and a control button 135 for moving a cursor displayed on the display unit 40 and selecting a display such as an icon on which the cursor is positioned, on the side face of the main body 10. The adjustment unit 100 may further include a cancel button 137 for stopping the reproduction of recorded data being reproduced, a power switch 139 for bringing the imaging apparatus 1 into an operating state, and a plurality of external device mode changeover switches 141 for changing the setting mode of the function of the device connected to the input terminal of the imaging apparatus 1, on the side face of the main body 10. The adjustment unit 100 may further include a plurality of adjustment dials 143 for adjusting the functions of the device connected to the input terminal of the imaging apparatus 1, and a slot selection button 145 for selecting a slot to be used out of slots in which a recording medium is mounted, on the side face of the main body 10. The adjustment unit 100 may further include a plurality of assignable buttons 147 which can be used by assigning functions of the imaging apparatus 1, and a volume adjustment button 149 which adjusts the volume when outputting sound recorded together with the recorded video, on the side face of the main body 10.

Among various switches or buttons that the adjustment unit 100 may have, the iris adjustment button 117, the gain adjustment button 119, the white balance adjustment button 121, and the shutter speed adjustment button 123 may correspond to the first operation unit 160 according to the present disclosure. In other words, the first operation unit 160 has a plurality of buttons corresponding to the setting items of the imaging conditions, and can adjust the setting items according to operation. The first operation unit 160 has the iris adjustment button 117, the gain adjustment button 119, the white balance adjustment button 121, and the shutter speed adjustment button 123 as examples of buttons corresponding to setting items of imaging conditions.

Note that the first operation unit 160 may include the iris adjustment button 117, the gain adjustment button 119, the white balance adjustment button 121, and the shutter speed adjustment button 123, but may also include a button or switch corresponding to a setting item for which automatic setting and manual setting can be selected, for example, the ND filter setting switch 105.

The first operation unit 160 is preferably disposed on the front face side of the main body 10 on the side face of the main body 10. Since the first operation unit 160 is disposed on the front face side of the main body 10 on the side face of the main body 10, the user can easily transition between the operation of the optical system 20 or the second operation unit 170 disposed on the front face of the main body 10 and the operation of the first operation unit 160 in a mutual manner.

The second operation unit 170 is capable of performing a rotating operation and a depressing operation. For example, the setting mode of the setting item selected by the button corresponding to the setting item of the imaging condition included in the first operation unit 160 may be selected by performing the rotating operation by the second operation unit 170, and the selected setting mode may be determined by performing the depressing operation. The selection and determination of the setting mode by the second operation unit 170 can suppress an increase in the number of operation members required for these operations. Further, since the user selects and determines the setting mode using the second operation unit 170, the user can operate the camera without significantly moving the position of the hand, and can suppress camera shake that may occur with the operation.

Note that the setting mode referred to here includes various modes that can be set in the imaging apparatus 1. The setting modes include, for example, a manual setting mode in which the setting value of the setting item can be changed by manual operation, an automatic setting mode in which an optimum value is calculating by a control unit 77 illustrated in FIG. 7 to set the setting value to the optimum value, a switching mode in which the manual setting mode and the automatic setting mode are switched, a setting item selection mode in which the setting item can be selected, and a stationary mode when the imaging apparatus 1 is in standby mode, when a video to be captured is being recorded, or when a recorded video is being reproduced.

The second operation unit 170 may be capable of performing a depressing operation from the front, for example. The second operation unit 170 may be, for example, cylindrical, disposed such that an axial direction of the cylinder is perpendicular to the front face of the main body 10, rotatable about the axis of the cylinder, and capable of being depressed in the axial direction. The shape of the second operation unit 170 may be, for example, a dial shape or a stick shape.

The second operation unit 170 is preferably disposed on a side face side of the front face of the main body 10 where the first operation unit 160 is provided, rather than the optical system 20. Since the second operation unit 170 is disposed on the first operation unit 160 side on the front face of the main body 10 to dispose the optical system 20, the first operation unit 160 and the second operation unit 170 in a concentrated manner, the operations of the optical system 20, the first operation unit 160 and the second operation unit 170 can be performed by one hand. Thus, for example, camera shake which may occur when the position of the hand is changed is suppressed, so that an image intended by the user can be captured.

Note that the conditions related to the setting items to be set by the second operation unit 170 include, for example, the setting mode of the setting item selected by the first operation unit 160, and the setting value of the relevant setting item.

(Optical System 20)

The optical system 20 has a plurality of lenses, a plurality of movable optical elements such as iris blades, and an actuator for driving these optical elements. The light condensed by the optical system 20 forms an image on an imaging element 12 included in the main body 10 illustrated in FIG. 7. The user can move a predetermined lens of the optical system 20 to perform zooming to change the angle of view of the photographed image and focus to adjust a focus on the subject. The user can also adjust brightness by adjusting the position of the iris blade. The optical system 20 is configured to be freely attachable to and detachable from the main body 10.

(Handle 30)

The handle 30 is provided on the upper face (the face on the Z-axis positive direction side) of the main body 10 and extends in the longitudinal direction of the main body 10. The user grips the handle 30 to easily carry the imaging apparatus 1. The handle 30 may have a mounting portion (not illustrated) for mounting the display unit 40 or the microphone holder 50 in the front.

(Display Unit 40)

Figure 3:
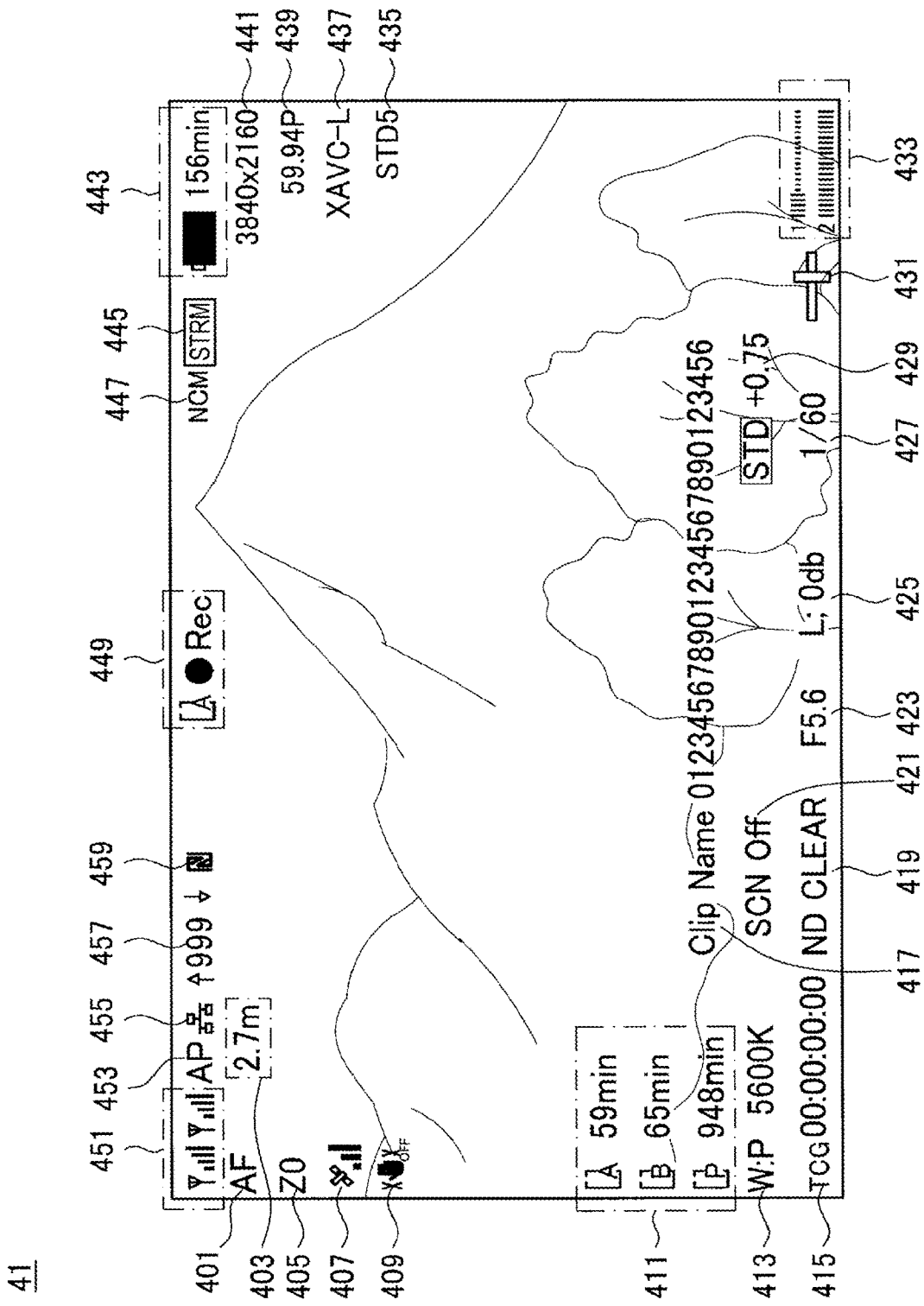
FIG. 3 is a diagram illustrating an example of a screen displayed on a display unit provided in the imaging apparatus according to the embodiment.

The display unit 40 may display, by the control unit 77, a captured image, or may display a display such as an icon indicating an operation mode, a remaining battery level, a manual setting value of an imaging condition, and a state of various settings. The display unit 40 may display an OSD (On Screen Display) image obtained by superimposing and displaying the above display on the captured image. FIG. 3 is a screen (stationary screen 41) on which an OSD image is displayed when the imaging apparatus 1 is recording a video to be captured or reproducing the recorded video. As illustrated in FIG. 3, the display unit 40 can display an OSD image in which an icon composed of characters, figures, or symbols, for example, is displayed on the captured image, by the control unit 77. Specifically, the display unit 40 may display an OSD image displaying a display 401 indicating a focus mode, a display 403 indicating a focus position, a display 405 indicating a zoom position, a display 407 indicating an acquisition state of position information, and an icon 409 indicating a state of a camera shake correction function, by the control unit 77. Further, the display unit 40 may display an OSD image displaying a display 411 indicating the remaining amount of the recording medium, a display 413 indicating the white balance, a display 415 indicating a time code which is time information of the recorded image, and a display 417 indicating a clip name, by the control unit 77. Further, the display unit 40 may display an OSD image displaying a display 419 indicating a use state of a profile set according to a photographing scene, a display 421 indicating the state of the ND filter, a display 423 indicating the position of the iris blade, a display 425 indicating the gain, and a display 427 indicating the shutter speed, by the control unit 77. Further, the display unit 40 may display an OSD image displaying a display 429 indicating an image quality level, a display 431 indicating an inclination of the imaging apparatus 1 with respect to the horizontal plane, a display (audio level meter) 433 indicating an audio level, a display 435 indicating a type of gamma value or gamma table, and a display 437 indicating a name of a recording format of a moving image recorded on the recording medium, by the control unit 77. Further, the display unit 40 may display an OSD image displaying a display 439 indicating the number of frames to be used per second, a display 441 indicating the size of the image to be recorded, an icon 443 indicating the remaining battery level, and an icon 445 indicating the display during streaming of the video or audio being shot and reproduced by the imaging apparatus 1, by the control unit 77. Further, the display unit 40 may display an OSD image displaying an icon 447 indicating an operation state when the imaging apparatus 1 operates as a network client, an icon 449 indicating a display of a slot in which a recording medium is mounted and an operation state, and an icon 451 indicating a network connection state, by the control unit 77. Further, the display unit 40 may display an OSD image displaying an icon 453 indicating that the imaging apparatus 1 is operating as an access point for connecting a terminal such as a PC or a tablet terminal to the Internet, an icon 455 indicating a connection state to a wired LAN, an icon 457 indicating a display during uploading to an external storage or indicating the remaining number of transferred files, or an icon 459 indicating that an NFC (Near Field Communication) function is effective, by the control unit 77. Further, the display unit 40 may superimpose different displays during recording and during reproduction of the recorded video on the captured image.

Figure 4:
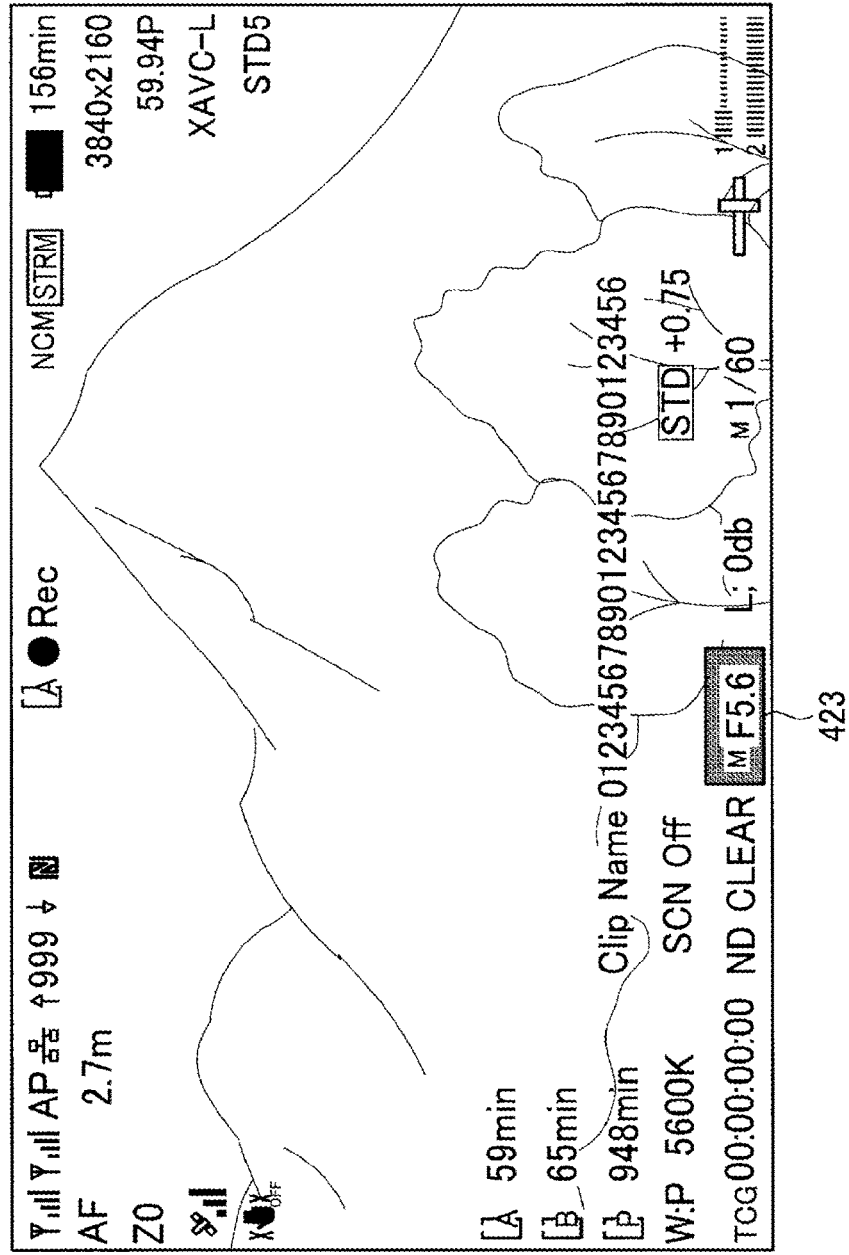
FIG. 4 is a diagram illustrating an example of the screen displayed on the display unit provided in the imaging apparatus according to the embodiment.

The display unit 40 may display a display corresponding to the operation of the first operation unit 160 or the second operation unit 170 while superimposing the display on the captured image, by the control unit 77. The display unit 40 can display, by the control unit 77, a display indicating the setting item selected by the first operation unit 160 by highlighting by, for example, a cursor. FIG. 4 is a screen (adjustment screen 42) displaying an OSD image in which the display 423 indicating the position of the iris blade is highlighted.

Figure 5:
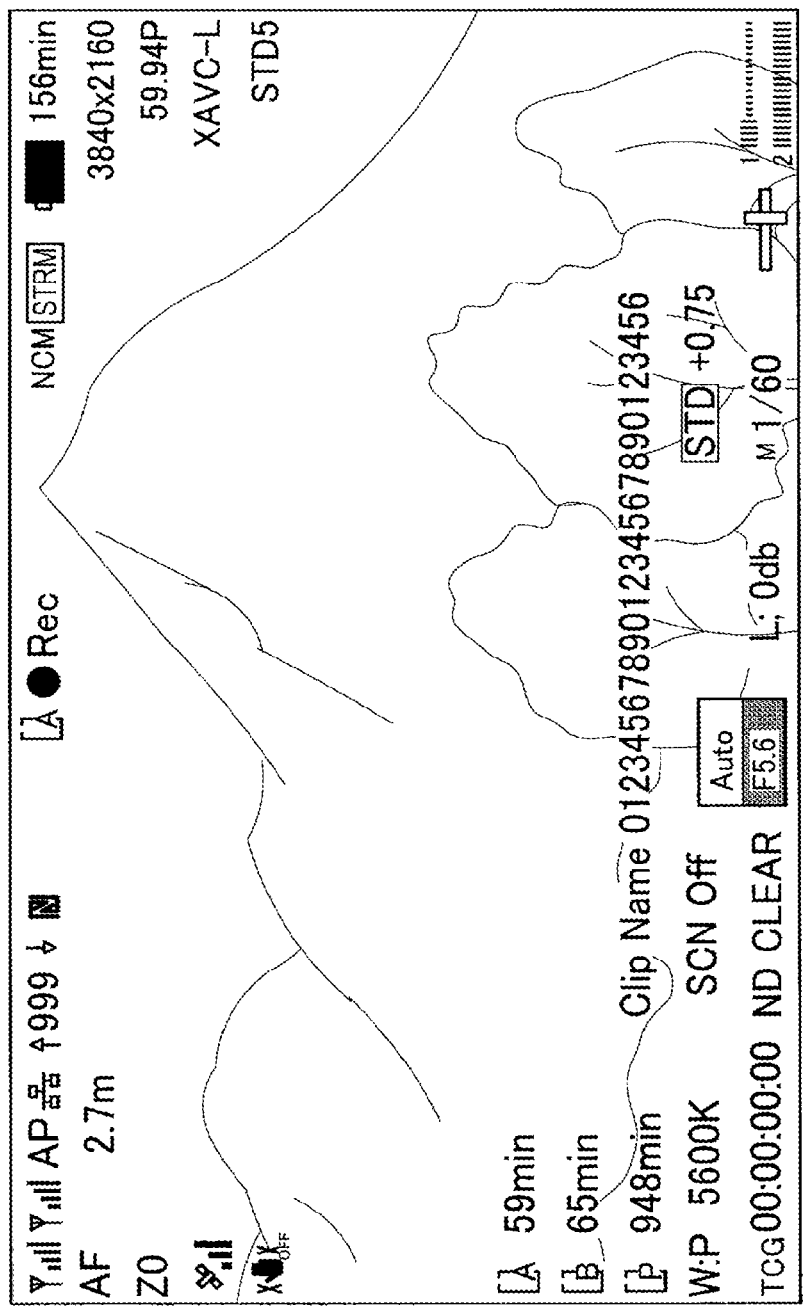
FIG. 5 is a diagram illustrating an example of the screen displayed on the display unit provided in the imaging apparatus according to the embodiment.

Further, the display unit 40 can perform display for changing the setting mode of the selected setting item, by the control unit 77. FIG. 5 is a screen (setting mode selection screen 43) displaying a display for changing the setting mode of the iris. In FIG. 5, an OSD image is displayed in which "Auto" indicating the automatic setting mode and the current setting value "F5.6" are displayed, for the iris. Although the details will be described below, the display of the current setting value may be selected by the second operation unit 170 to transition to the manual setting mode.

Figure 6:
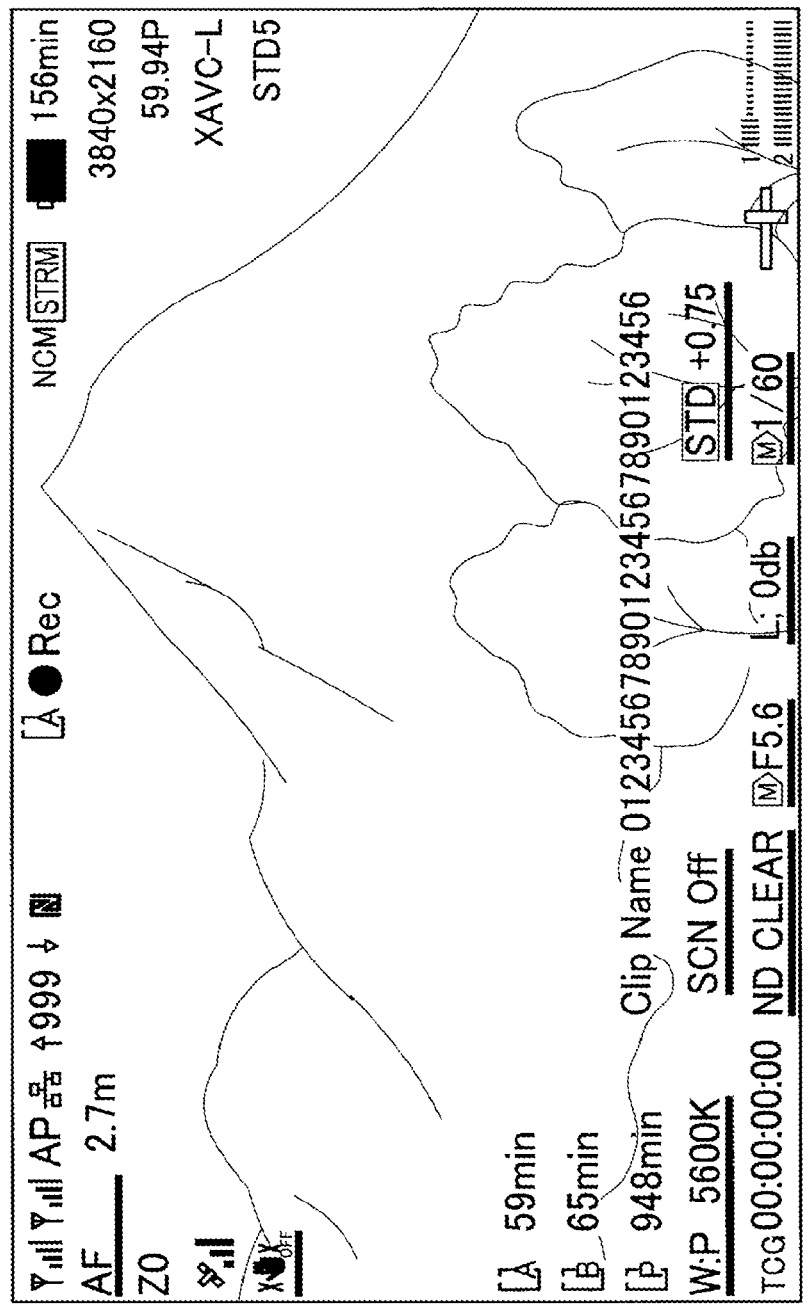
FIG. 6 is a diagram illustrating an example of the screen displayed on the display unit provided in the imaging apparatus according to the embodiment.

Further, the display unit 40 can highlight the setting items selectable by the second operation unit 170, by the control unit 77. FIG. 6 is a screen (setting item selection screen 44) in which setting items selectable by the second operation unit 170 are highlighted. In FIG. 6, an OSD image is displayed in which the display 401 indicating the focus mode, the icon 409 indicating the state of the camera shake correction function, the display 413 indicating the white balance, the display 419 indicating the use state of the profile set according to the photographing scene, the display 421 indicating the state of the ND filter, the display 423 indicating the position of the iris blade, the display 425 indicating the gain, the display 427 indicating the shutter speed, and the display 429 indicating the image quality level are highlighted.

Since information corresponding to the operation of the first operation unit 160 or the second operation unit 170 is superimposed and displayed on the image captured on the display unit 40, the user can change the imaging condition while checking the captured image, and even when the button is pressed erroneously, the user can recognize the error early and perform an appropriate operation. Thus, photographing can be performed more smoothly.

Note that the displays on the display unit 40, such as the operation mode, the remaining battery level, the manual setting value of the imaging condition, and icons indicating the status of various settings, are not limited to the above, and the display unit 40 can display, by the control unit 77, a display of a function that can be controlled by the control unit 77 described below.

Note that although the position of the display unit 40 is not particularly limited, the position and angle of the display unit is preferably adjustable. Thus, the position of the display unit 40 can be changed according to the recording state. For example, in FIG. 1, the display unit 40 is provided on the handle 30 by a rotatable support member.

(Microphone Holder 50)

The microphone holder 50 is used for mounting a microphone for recording sound with high sound quality to the imaging apparatus 1. The microphone holder 50 is not particularly limited in terms of its position if the microphone holder is disposed at a position where a microphone attached to the microphone holder 50 can collect sound desired to be recorded, but is preferably disposed to be adjustable in position and angle. Thus, the position of the microphone can be changed according to the recording state. For example, in FIG. 1, the microphone holder 50 is provided on the handle 30 by a rotatable support member.

(Grip Remote Controller 60)

The grip remote controller 60 can be used in place of operating the adjustment unit 100 for a part of the function provided in the adjustment unit 100 while being held by the user. The grip remote controller 60 may have an assignable button which can be used by assigning a function possessed by the imaging apparatus 1, an assignable dial (not illustrated) for changing a setting value, and a zoom lever (not illustrated) for enlarging and reducing an image, for example. For example, in FIG. 1, the grip remote controller 60 is provided on the main body 10 via a support member which can be changed in angle and length.

The example of the external configuration of the imaging apparatus 1 has been described above. Note that the external configuration of the imaging apparatus 1 illustrated in FIGS. 1 and 2 is an example, and each configuration of the imaging apparatus 1 according to the present embodiment is not limited to the modes illustrated in these drawings. The imaging apparatus according to the present embodiment may include, for example, an input terminal for connecting to another device. The presence, shape and arrangement of various operation buttons, switches and dials are not limited to the embodiment illustrated in FIG. 2.

1-2. Example of Internal Configuration

Figure 7:
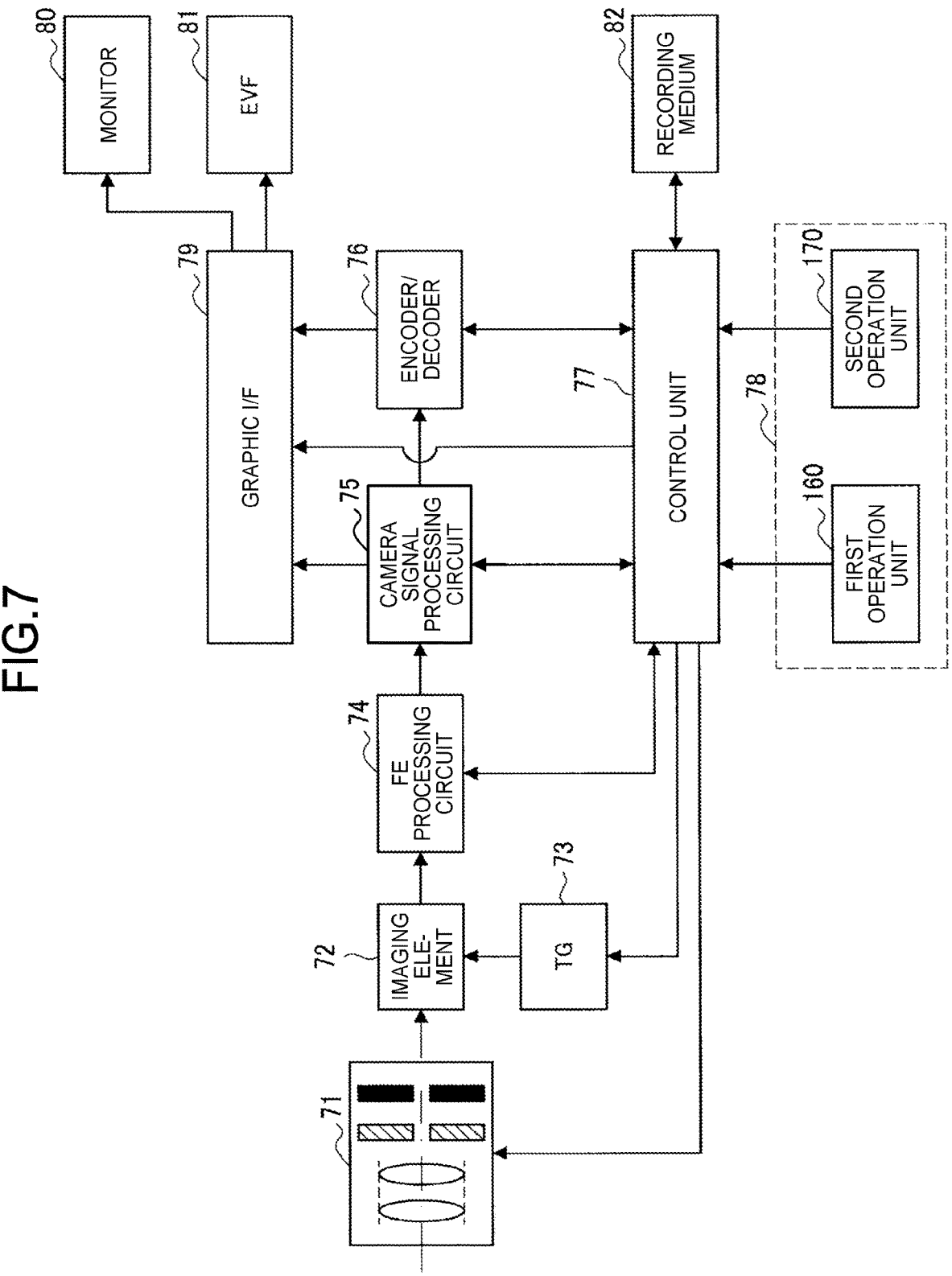
FIG. 7 is a block diagram illustrating an example of an internal configuration of the imaging apparatus according to the embodiment.

An example of an internal configuration of the imaging apparatus 1 according to the present embodiment will now be described. FIG. 7 is a block diagram illustrating an example of the internal configuration of the imaging apparatus 1 according to the present embodiment. As illustrated in FIG. 7, the imaging apparatus 1 includes an optical block 71, an imaging element 72, a TG (Timing Generator) 73, an FE (Front End) processing circuit 74, a camera signal processing circuit 75, an encoder/decoder 76, a control unit 77, an input unit 78, a graphic I/F (interface) 79, a monitor 80, an electronic view finder (EVF) 81, and a recording medium 82.

The optical block 71 includes, for example, a lens for condensing light from a subject onto the imaging element 72, a drive mechanism for moving the lens to focus and zoom, a shutter mechanism, and an iris mechanism including an iris blade, which are driven based on a control signal from the control unit 77. The optical block 71 is mounted on the optical system 20.

The imaging element 72 is driven based on a timing signal outputted from the TG 73, and converts incident light from the subject into an electric signal. Note that the imaging element 72 may be a CCD (Charge Coupled Device) or a CMOS (Complementary Metal Oxide Semiconductor) image sensor, for example. The TG 73 generates a timing signal according to a control signal from the control unit 77 and outputs the timing signal to the imaging element 72.

Under the control of the control unit 77, the FE processing circuit 74 stores an input signal and performs sample-hold of holding the input signal for a certain period of time so as to maintain a favorable S/N (Signal/Noise) ratio by CDS (Correlated Double Sampling) processing, for an image signal outputted from the imaging element 72, further controls a gain which is a ratio of output to input by AGC (Auto Gain Control) processing, performs A/D conversion, and outputs a digital image signal.

Under the control of the control unit 77, the camera signal processing circuit 75 performs camera signal processing such as white balance adjustment processing, color correction processing, AF (Auto Focus) processing, AE (Auto Exposure) processing, and AWB (Auto White Balance) processing on the image signal from the FE processing circuit 74.

Under the control of the control unit 77, the encoder/decoder 76 performs compression encoding processing on an image signal from the camera signal processing circuit 75 or the encoder/decoder 76 in a predetermined moving image data format such as a DV (Digital Video) system or an MPEG (Moving Picture Experts Group) system. The encoder/decoder 76 decompresses and decodes the encoded data of the moving image supplied from the control unit 77. Note that still image data formats such as JPEG (Joint Photographic Coding Experts Group) may be used to perform compression coding and decompression decoding of still images.

The control unit 77 is, for example, a microcontroller composed of a CPU (Central Processing Unit), a ROM (Read Only Memory), and a RAM (Random Access Memory), and executes a program stored in, for example, a ROM to integrally control each unit of a digital video camera. The control unit 77 can perform, for example, control according to control signals inputted by, for example, various buttons, switches and dials included in the adjustment unit 100 including the first operation unit 160 and the second operation unit 170.

For example, the control unit 77 may transition the setting mode to a manual setting mode in which the setting value of the setting item corresponding to the button can be changed by manual operation when the depression time of the button in the first operation unit 160 is less than or equal to a predetermined time, and may transition the setting mode to a switching mode in which switching between two modes of the manual setting mode and the automatic setting mode in which the control unit 77 sets the setting value to the optimum value is enabled for the setting item corresponding to the button when the depression time of the button exceeds a predetermined time. Thus, the processing for changing the setting mode of the desired setting item and its setting value can be performed in fewer operation steps.

As described above, in the automatic setting mode, the control unit 77 may calculate an optimum value of the setting item in the automatic setting mode and set the setting value of the setting item to the optimum value.

Further, in the switching mode, the control unit 77 may select the setting mode of the setting item selected by the button of the first operation unit 160 by the rotating operation performed by the second operation unit 170, and may determine the selected setting mode by the depressing operation performed by the second operation unit 170. Further, in the manual setting mode, the control unit 77 may change the setting value of the setting item selected by the button arranged on the first operation unit 160 by performing the rotating operation of the second operation unit 170. When the control unit 77 performs the above control, the first operation unit 160 and the second operation unit 170 can select the setting item of the imaging condition and determine the setting mode, so that an increase in the number of operation members can be suppressed.

Further, in the manual setting mode, the control unit 77 may switch from the manual setting mode to the automatic setting mode when the speed of the rotating operation of the second operation unit 170 is a predetermined speed or more. In the manual setting mode, the control unit 77 switches from the manual setting mode to the automatic setting mode when the speed of the rotating operation of the second operation unit 170 is a predetermined speed or more. The user can thereby reduce the number of steps required for changing the setting mode and can more easily switch from the manual setting mode to the automatic setting mode.

The input unit 78 is composed of, for example, various buttons, switches and dials included in the adjustment unit 100 including the first operation unit 160 and the second operation unit 170 as described above, and outputs a control signal corresponding to an input operation by the user to the control unit 77.

Under the control of the control unit 77, the graphic I/F 79 generates an image signal for displaying on the monitor 80 or the EVF 81 from an image signal supplied from the camera signal processing circuit 75 or the encoder/decoder 76, and supplies the generated image signal to the monitor 80 or the EVF 81 to display the image. The graphic I/F 79 displays an image being captured and a reproduced image of data recorded on the recording medium 82, and can display a display indicating, for example, an operation mode, a remaining battery level, a manual setting value of an imaging condition, or a menu for various settings while superimposing the display on the captured image based on a signal from the control unit 77. Both the monitor 80 and the EVF 81 are composed of, for example, an LCD (Liquid Crystal Display), and display an image being captured and a reproduced image, for example. The display unit 40 can be implemented by the monitor 80 or the EVF 81.

Data supplied from the control unit 77 is written in the recording medium 82, and data read from the recording medium 82 is outputted to the control unit 77. Note that as the recording medium 82, for example, a memory card constituted of a semiconductor memory, a writable optical disk, an HDD (hard disk drive), or a magnetic tape may be used.

The imaging apparatus 1 has a communication interface (not illustrated) and can also transmit and receive data to and from an external storage (for example, data server, network storage, or external memory). The communication interface may be, for example, a wireless LAN (Local Area Network), Bluetooth (registered trade mark), Wi-Fi (registered trade mark), for example.

In the imaging apparatus 1, the light passing through the optical block 71 is received by the imaging element 72, is photoelectrically converted into an electric signal, and the photoelectrically converted electric signal is sequentially supplied to the FE processing circuit 74. In the FE processing circuit 74, the input signal is subjected to CDS processing and AGC processing and further converted into a digital signal. The camera signal processing circuit 75 performs image quality correction processing on the digital image signal supplied from the FE processing circuit 74 and supplies the digital image signal to the graphic I/F 79 via the control unit 77. Thus, the image subjected to the image quality correction processing is displayed on the monitor 80 or the EVF 81.

In this state, when the recording start is requested through the input unit 78, the image signal from the camera signal processing circuit 75 is compressed and encoded by the encoder/decoder 76 to generate encoded data. The encoded data are sequentially recorded on the recording medium 82 through the control unit 77.

The example of the internal configuration of the imaging apparatus 1 according to the present embodiment has been described above. Note that the internal configuration illustrated in FIG. 7 is merely an example, and the internal configuration of the imaging apparatus according to the present disclosure is not limited thereto. For example, the imaging apparatus 1 may include a known self-position detecting unit (not illustrated) such as a GPS (Global Positioning System).

2. Operation

2-1. Operation Process

Figure 8:
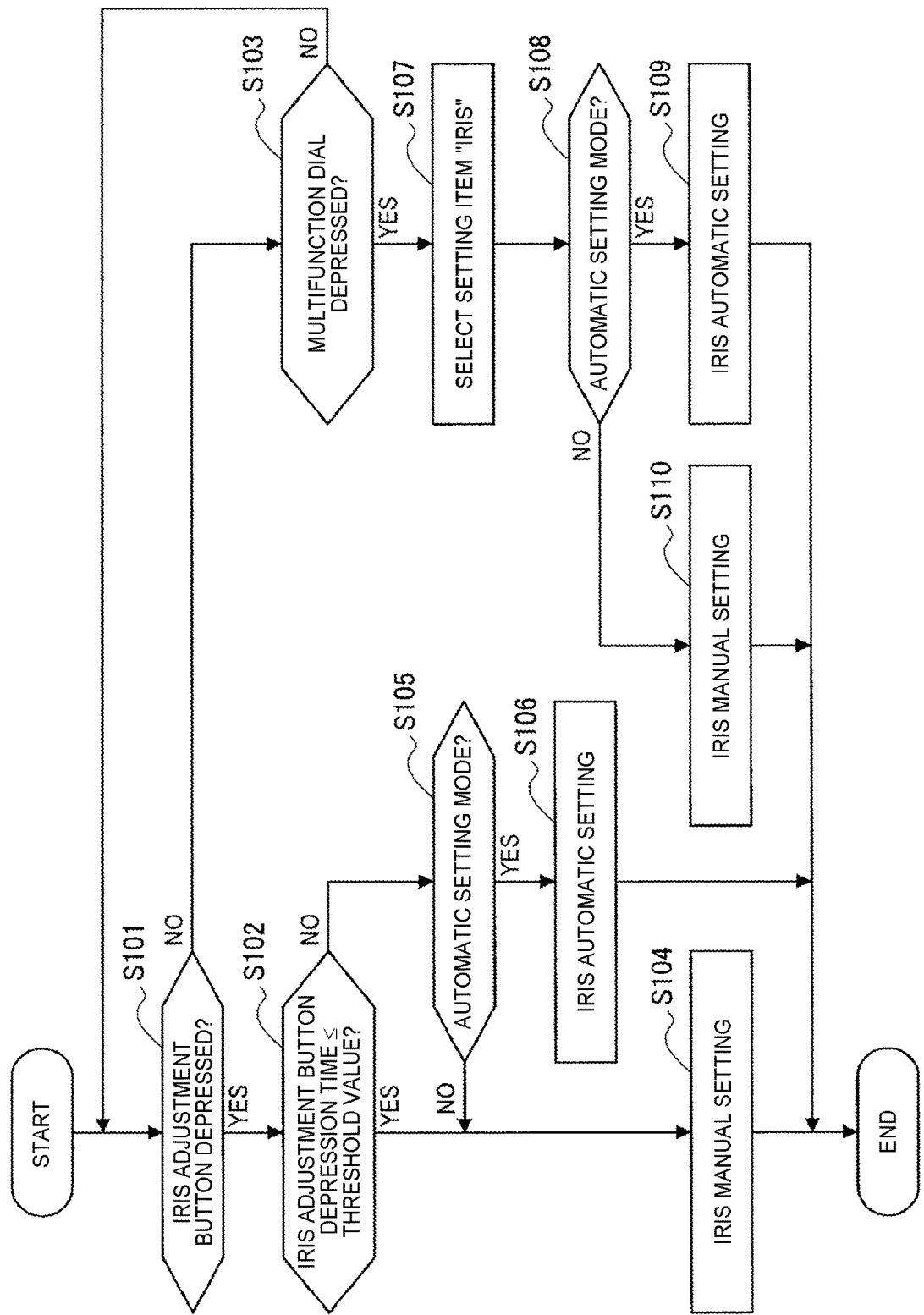
FIG. 8 is a flowchart illustrating an example of a flow of processing for changing an imaging condition by the imaging apparatus according to the embodiment.

An example of the operation of processing for changing the imaging condition by the imaging apparatus 1 according to the present embodiment will now be described with reference to FIG. 8. FIG. 8 is a flowchart illustrating an example of a flow of processing for changing the imaging condition by the imaging apparatus 1 according to the present embodiment. Note that an example in which an iris is changed will now be described.

The control unit 77 first determines whether the iris adjustment button 117 of the first operation unit 160 has been depressed (step S101). If it is determined that the iris adjustment button 117 has been depressed (step S101/YES), the control unit 77 determines whether the depression time of the iris adjustment button 117 is less than or equal to a predetermined threshold value (step S102). On the other hand, if it is not determined that the iris adjustment button 117 has been depressed (step S101/NO), the control unit 77 determines whether the second operation unit 170 (the second operation unit 170 may be hereinafter referred to as a multifunction dial 170) has been depressed (step S103).

If it is determined in step S102 that the depression time of the iris adjustment button 117 is less than or equal to a predetermined threshold value (step S102/YES), the control unit 77 transitions the setting mode from the stationary mode to the manual setting mode (step S104). At this point, as illustrated in FIG. 4, the display unit 40 displays the adjustment screen 42 in which the display 423 indicating the position of the iris blade is highlighted. In step S104, the user rotates the multifunction dial 170 to change the iris. At this point, the captured image becomes an image having brightness corresponding to the changed iris. Further, the display 423 indicating the position of the iris blade displayed on the display unit 40 is changed according to the rotating operation of the multifunction dial 170.

On the other hand, if it is determined that the depression time of the iris adjustment button 117 exceeds a predetermined threshold value (step S102/NO), the control unit 77 transitions the setting mode of the iris from the stationary mode to the switching mode (step S105). At this point, as illustrated in FIG. 5, the display unit 40 displays the setting mode selection screen 43 displaying a display for changing the setting mode of the iris. In step S105, the user rotates the multifunction dial 170, selects either the automatic setting mode or the manual setting mode, and depresses the multifunction dial 170 to determine either the automatic setting mode or the manual setting mode, and the mode is transitioned to the determined setting mode. If the mode is transitioned to the automatic setting mode (step S105/YES), the iris is set by the control unit 77, and the captured image becomes an image having brightness corresponding to the changed iris (step S106). If the mode is transitioned to the manual setting mode (step S106/NO), the processing of the above step S104 is performed.

If it is determined in step S103 that the multifunction dial 170 is depressed (step S103/YES), the control unit 77 transitions the setting mode to the setting item selection mode in which the setting item can be selected (step S107). At this point, the display unit 40 displays the setting item selection screen 44 in which setting items selectable by the multifunction dial 170 are highlighted. In step S107, the user rotates the multifunction dial 170, selects the iris as a setting item, and depresses the multifunction dial 170 to transition the setting mode of the iris from the setting item selection mode to the switching mode (step S108).

In step S108, the user rotates the multifunction dial 170, selects either the automatic setting mode or the manual setting mode, and depresses the multifunction dial to determine either the automatic setting mode or the manual setting mode, and the mode is transitioned to the determined setting mode. If the mode is transitioned to the automatic setting mode (step S108/YES), the iris is set by the control unit 77, and the captured image becomes an image having brightness corresponding to the changed iris (step S109). If the mode is transitioned to the manual setting mode (step S108/NO), the second operation unit 170 is operated by the user to manually adjust the iris (step S110). Since the processing performed in step S110 is the same as the processing in step S104 described above, the description thereof will be omitted.

If it is determined in step S103 that the multifunction dial has not been depressed (step S103/NO), the above processing is repeated from step S101 as needed.

After steps S105, S107, S112, and S113, if the buttons of the first operation unit 160 and the multifunction dial 170 are not operated for a predetermined period of time, the processing for changing the imaging conditions ends.

The example of the operation of processing for changing the imaging condition by the imaging apparatus 1 according to the present embodiment has been described above. Note that the operation process illustrated in FIG. 8 is an example, and the present embodiment is not limited thereto. For example, in the operation process illustrated in FIG. 8, the adjustment screen 42, the setting mode selection screen 43, and the setting item selection screen 44 are displayed on the display unit 40 in each of steps S104, S105, and S107, but these screens need not be displayed.

2-2. Screen Transition

Figure 9:
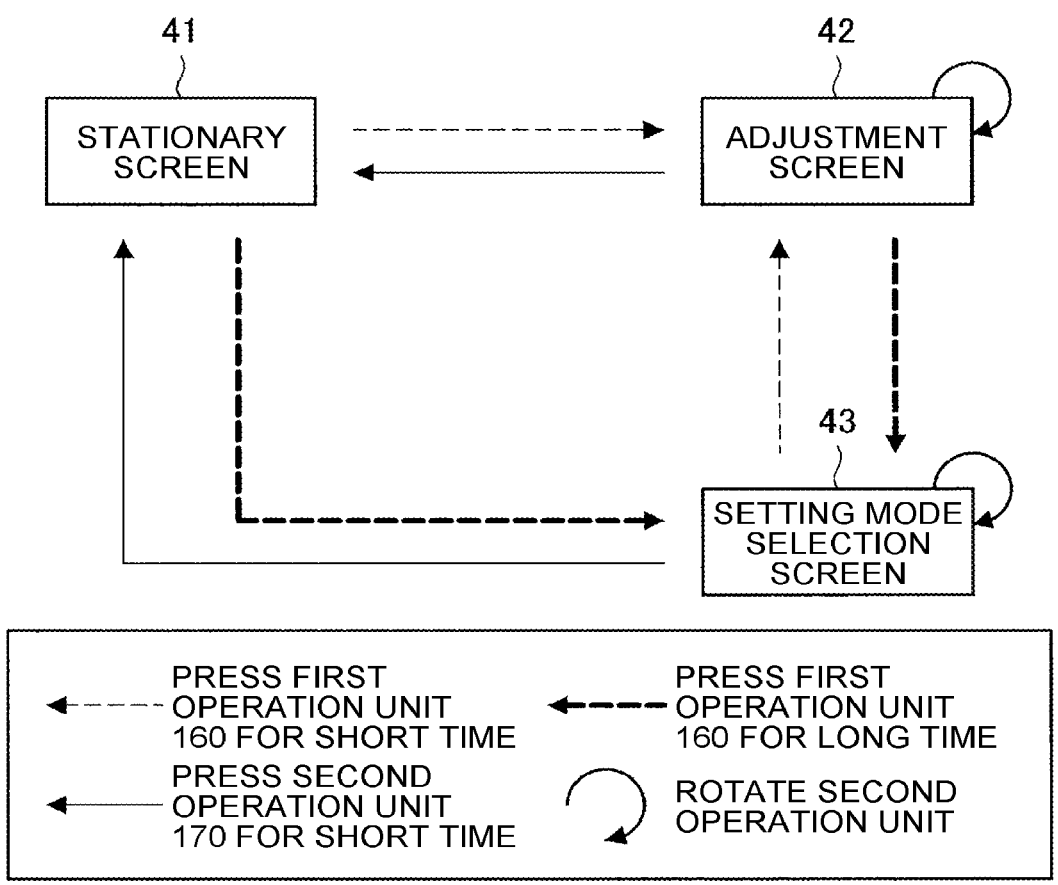
FIG. 9 is a diagram illustrating an example of a screen transition displayed by processing for changing an imaging condition by the imaging apparatus according to the embodiment.
Figure 10:
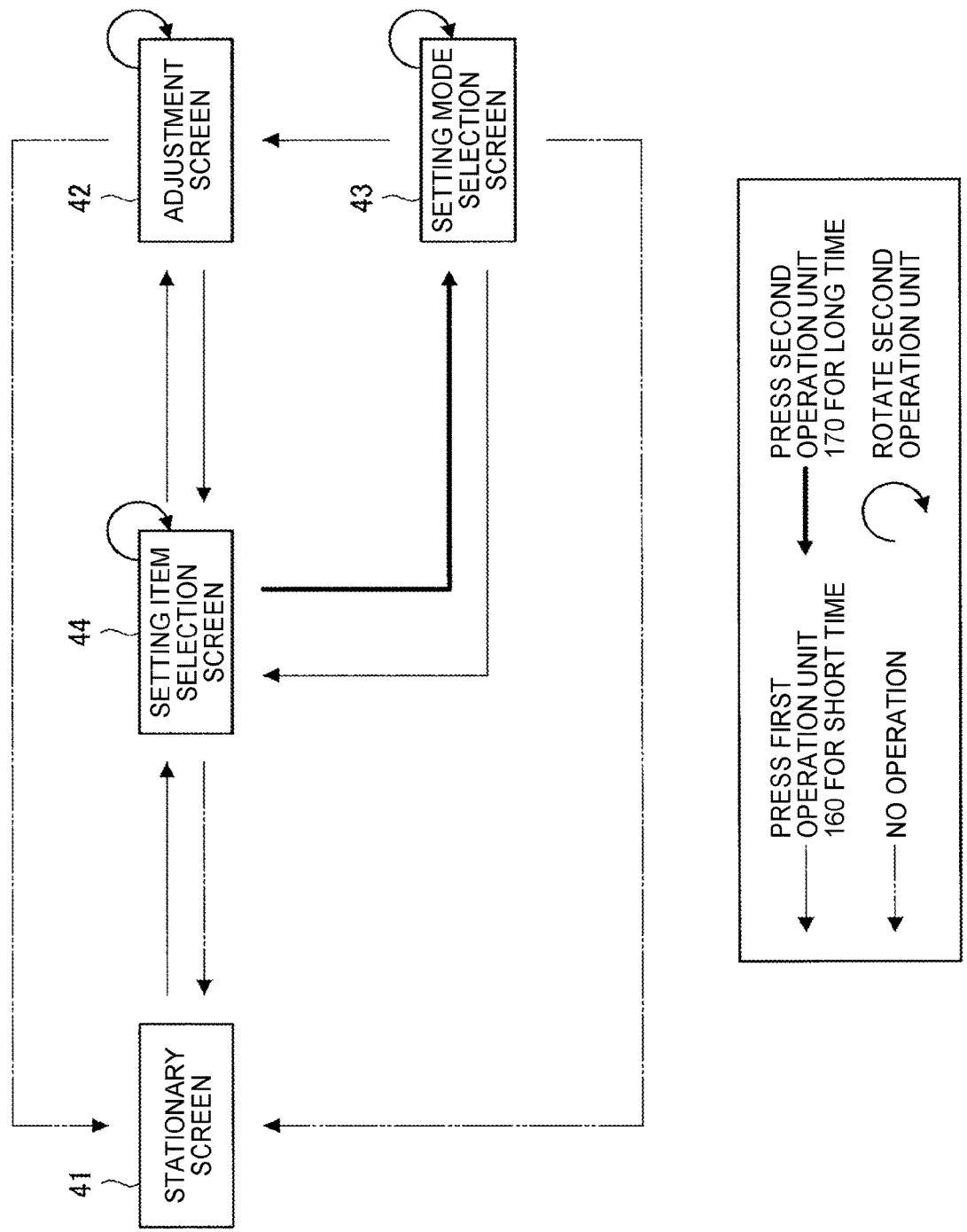
FIG. 10 is a diagram illustrating another example of a screen transition displayed by processing for changing an imaging condition by the imaging apparatus according to the embodiment.

Screen transitions caused by the operations of the first operation unit 160 and the second operation unit 170 will now be described in detail with reference to FIGS. 9 and 10. FIG. 9 is a diagram illustrating an example of a screen transition displayed by processing for changing the imaging condition by the imaging apparatus according to the present embodiment. FIG. 10 is a diagram illustrating another example of the screen transition displayed by processing for changing the imaging condition by the imaging apparatus according to the present embodiment.

The stationary screen 41 illustrated in FIGS. 9 and 10 is a stationary screen displayed in a stationary mode when the imaging apparatus 1 is in standby, when a video to be captured is being recorded, or when a recorded video is being reproduced. FIG. 4 is an example of the stationary screen 41. The adjustment screen 42 illustrated in FIGS. 9 and 10 is a screen displayed in the manual setting mode, in which the display of the setting item selected by the first operation unit 160 is highlighted. FIG. 5 is an example of the adjustment screen 42. The setting mode selection screen 43 illustrated in FIGS. 9 and 10 is a screen displayed in the switching mode, and is a screen for selecting the manual setting mode or the automatic setting mode for the selected setting item. FIG. 6 is an example of the setting mode selection screen 43. The setting item selection screen 44 illustrated in FIG. 10 is a screen displayed when the setting item can be selected by the multifunction dial 170, in which setting items are highlighted. FIG. 7 is an example of the setting item selection screen 44. Note that the "pressing for a short time" illustrated in FIGS. 9 and 10 means that the depression time is less than or equal to a predetermined threshold value, and the "pressing for a long time" means that the depression time exceeds a predetermined threshold value.

2-2-1. First Example

A screen transition when the first operation unit 160 is mainly used will first be described with reference to FIG. 9. In the stationary screen 41, when the first operation unit 160 is depressed for a time less than or equal to a predetermined threshold value, the screen may be transitioned to the adjustment screen 42. Further, in the setting mode selection screen 43, when the first operation unit 160 is depressed for a time less than or equal to a predetermined threshold value, the screen may be transitioned to the adjustment screen 42. As described above, if the depression time of the first operation unit 160 is less than or equal to a predetermined threshold value, the screen may be transitioned from either the stationary screen 41 or the setting mode selection screen 43 to the adjustment screen 42. The screen transition allows to transition directly to the adjustment screen 42 without performing a two-step operation of transitioning to the adjustment screen 42 after transitioning to the stationary screen 41 or the setting item selection screen 44. Thus, the imaging condition can be changed in a short time, and even when the object to be imaged is changed, an image conforming to the intention of the user can be recorded.

In the adjustment screen 42, the user can rotate the multifunction dial 170 to change the setting value of the selected setting item.

On the other hand, in the stationary screen 41, when the first operation unit 160 is depressed for a time exceeding a predetermined threshold value, the screen may be transitioned to the setting mode selection screen 43. Further, in the adjustment screen 42, when the first operation unit 160 is depressed for a time exceeding a predetermined threshold value, the screen may also be transitioned to the setting mode selection screen 43. As described above, if the depression time of the first operation unit 160 exceeds a predetermined threshold value, as illustrated in FIG. 9, the screen may be transitioned from either the stationary screen 41 or the adjustment screen 42 to the setting mode selection screen 43. The screen transition allows to transition directly to the setting mode selection screen 43 without performing a two-step operation of transitioning to the setting mode selection screen 43 after transitioning to the stationary screen 41 or the setting item selection screen 44. Further, since the transition to the adjustment screen 42 and the transition to the setting mode selection screen 43 can be performed by a single operation of the first operation unit 160, the user can operate the imaging apparatus 1 without changing the position of the hand to operate the imaging apparatus. Thus, for example, camera shake which may occur when the position of the hand is changed is suppressed, so that an image intended by the user can be captured.

In a setting mode selection screen 43, the user rotates the multifunction dial 170, selects either the automatic setting mode or the manual setting mode, and depresses the multifunction dial 170 to determine either the automatic setting mode or the manual setting mode, and the mode is transitioned to the determined setting mode. As illustrated in FIG. 5, the display of the current setting value may be selected to transition to the manual setting mode. When the mode is transitioned to the manual setting mode, the display unit 40 displays the adjustment screen 42, and when the mode is transitioned to the automatic setting mode, the setting value is changed to the optimum value, and the display unit 40 displays the stationary screen 41.

Note that in the adjustment screen 42 or the setting mode selection screen 43, if the first operation unit 160 and the multifunction dial 170 are not operated for a predetermined time, the screen may be transitioned from the adjustment screen 42 or the setting mode selection screen 43 to the stationary screen 41.

Further, in the adjustment screen 42 for a predetermined setting item, the function button corresponding to the setting item of the first operation unit 160 may be depressed for a time less than or equal to the threshold value to transition from the adjustment screen 42 to the stationary screen 41.

Further, in the adjustment screen 42 for a predetermined setting item, the function button corresponding to the setting item other than the setting item of the first operation unit 160 may be depressed for a time less than or equal to the threshold value to transition from the adjustment screen 42 for the previous setting item to the adjustment screen for the subsequent setting item.

The screen transition when the first operation unit 160 is mainly used has been described above.

2-2-2. Second Example

The transition of the imaging condition setting mode when the multifunction dial 170 is mainly used will now be described with reference to FIG. 10. In the stationary screen 41, when the multifunction dial 170 is depressed, as illustrated in FIG. 10, the screen may be transitioned from the stationary screen 41 to the setting item selection screen 44. In the setting item selection screen 44, the user may rotate the multifunction dial 170, select the setting item, and depress the multifunction dial 170 for a time less than or equal to a predetermined time to transition to the adjustment screen 42.

In the adjustment screen 42, the user can rotate the multifunction dial 170 to change the setting value of the selected setting item.

Further, in the setting item selection screen 44, the multifunction dial 170 may be depressed for a time exceeding a predetermined time to transition from the setting item selection screen 44 to the setting mode selection screen 43 of the selected setting item.

In a setting mode selection screen 43, the user rotates the multifunction dial 170, selects either the automatic setting mode or the manual setting mode, and depresses the multifunction dial 170 to determine either the automatic setting mode or the manual setting mode, and the mode is transitioned to the determined setting mode. When the mode is transitioned to the manual setting mode, the display unit 40 displays the adjustment screen 42, and when the mode is transitioned to the automatic setting mode, the setting value is changed to the optimum value, and the display unit 40 displays the stationary screen 41.

Note that in the adjustment screen 42, the setting mode selection screen 43 or the setting item selection screen 44, if the first operation unit 160 and the multifunction dial 170 are not operated for a predetermined time, the screen may be transitioned from the adjustment screen 42, the setting mode selection screen 43 or the setting item selection screen 44 to the stationary screen 41.

Further, in the adjustment screen 42 for a predetermined setting item, the function button corresponding to the setting item of the first operation unit 160 may be depressed for a time less than or equal to the threshold value to transition from the adjustment screen 42 to the stationary screen 41.

Further, in the adjustment screen 42, the multifunction dial 170 may be depressed for a time less than or equal to a predetermined time to transition from the adjustment screen 42 to the setting item selection screen 44. The second example has been described above.

Note that in the processing described in the first and second examples, any of the buttons of the first operation unit 160 may be depressed for a time less than or equal to a predetermined threshold value to transition from the setting item selection screen 44 to the adjustment screen 42.

The screen transitions caused by the operations of the first operation unit 160 and the second operation unit 170 have been described above. Note that the operations of the first operation unit 160 and the second operation unit 170 described above may transition the setting mode of the imaging condition without transitioning the screen displayed on the display unit 40.

The example of the operation process according to the present embodiment has been described above. The imaging apparatus according to the present embodiment can change the imaging condition in fewer operation steps.

3. Summary

While preferred embodiments of the present disclosure have been described above in detail with reference to the accompanying drawings, the present technique is not limited to such examples. It is obvious to those skilled in the art of the present disclosure that various changes or modifications may be conceivable within the scope of the technical ideas set forth in the claims, which are also understood to fall naturally within the technical scope of the present disclosure.

For example, a computer program can also be created to make hardware such as a CPU, a ROM, and a RAM built into the imaging apparatus 1 described above perform the function of the imaging apparatus 1. Also provided is a computer readable storage medium on which the computer program is stored.

Further, the effects described herein are illustrative or exemplary only and not restrictive. In other words, the technique according to the present disclosure may have other effects obvious to those skilled in the art from the description herein together with or in place of the above effects.

Note that the present technique may also have the following configuration.

(1)

An imaging apparatus comprising:

a first operation unit having a plurality of buttons corresponding to setting items of imaging conditions, and capable of adjusting the setting items according to operation; and a second operation unit capable of performing a rotating operation and a depressing operation and setting conditions related to the setting items according to operation.

(2)

The imaging apparatus according to (1), comprising a control unit setting an imaging condition, wherein the control unit sets a mode to a manual setting mode in which a setting value of a setting item corresponding to the button can be changed by manual operation when a depression time of the button in the first operation unit is less than or equal to a predetermined time, and the control unit sets a mode to a switching mode in which switching between two modes of the manual setting mode and an automatic setting mode in which an optimum value is calculated by the control unit to set a setting value to the optimum value is enabled for the setting item when the depression time of the button exceeds a predetermined time.

(3)

The imaging apparatus according to (2), wherein, in the switching mode, the control unit selects the setting mode of the setting item selected by the button by performing the rotating operation by the second operation unit; and the control unit determines the selected setting mode by performing the depressing operation by the second operation unit.

(4)

The imaging apparatus according to (2) or (3), wherein, in the manual setting mode, the control unit changes the setting value of the setting item selected by the button by performing the rotating operation of the second operation unit.

(5)

The imaging apparatus according to any one of (2) to (4), wherein, in the manual setting mode, the control unit switches from the manual setting mode to the automatic setting mode when a speed of the rotating operation of the second operation unit is a predetermined speed or more.

(6)

The imaging apparatus according to any one of (2) to (5), comprising a display unit displaying information related to the setting item, wherein the control unit displays information corresponding to operations of the first operation unit and the second operation unit on the display unit.

(7)

The imaging apparatus according to (6), wherein the control unit superimposes information corresponding to the operation of the first operation unit or the second operation unit on a captured image and displays the superimposed information on the display unit.

(8)

The imaging apparatus according to any one of (1) to (7), wherein the second operation unit is arranged on a front face of a main body on which an optical system is disposed, and the first operation unit is disposed on a side face of the main body.

(9)

The imaging apparatus according to (8), wherein the second operation unit is disposed on a side face side of the front face of the main body where the first operation unit is provided, rather than the optical system.

(10)

The imaging apparatus according to (8) or (9), wherein the second operation unit is capable of performing a depressing operation from its front.

(11)
The imaging apparatus according to any one of (8) to (10), wherein
the second operation unit is cylindrical and disposed such that an axial direction of the cylinder is perpendicular to the front face of the main body, and
the second operation unit is rotatable about an axis of the cylinder and capable of being depressed in the axial direction.

(12)
The imaging apparatus according to any one of (1) to (11), wherein the setting item includes at least any of an iris, a gain, a shutter speed, or a white balance.

(13)
A control method, by a processor, comprising:
being capable of adjusting setting items according to operations of a plurality of buttons corresponding to setting items of imaging conditions; and
setting conditions related to the setting items according to operation of a member having a shape capable of performing a rotating operation and a depressing operation.

(14)
A program for causing a computer to:
allow a plurality of buttons corresponding to setting items of imaging conditions to function as a first operation unit capable of adjusting the setting items according to operation; and
allow a member having a shape capable of performing a rotating operation and a depressing operation to function as a second operation unit setting conditions related to the setting items according to operation.

REFERENCE SIGNS LIST

1 IMAGING APPARATUS
10 MAIN BODY
20 OPTICAL SYSTEM
30 HANDLE
40 DISPLAY UNIT
41 STATIONARY SCREEN
42 ADJUSTMENT SCREEN
43 SETTING MODE SELECTION SCREEN
44 SETTING ITEM SELECTION SCREEN
50 MICROPHONE HOLDER
60 GRIP REMOTE CONTROLLER
100 ADJUSTMENT UNIT
117 IRIS ADJUSTMENT BUTTON
119 GAIN ADJUSTMENT BUTTON
121 WHITE BALANCE ADJUSTMENT BUTTON
123 SHUTTER SPEED ADJUSTMENT BUTTON
160 FIRST OPERATION UNIT
170 SECOND OPERATION UNIT (MULTIFUNCTION DIAL)

The invention claimed is:

1. An imaging apparatus, comprising:
a first operation interface having a plurality of buttons corresponding to setting items of imaging conditions, and configured to adjust the setting items according to an operation of the first operation interface;
a second operation interface configured to perform a rotating operation and a depressing operation, and set conditions related to the setting items according to an operation of the second operation interface; and
control circuitry configured to set an imaging condition, wherein the control circuitry is further configured to set a mode to a manual setting mode in which a particular setting value of a particular setting item corresponding to a button in the first operation interface can be changed by manual operation when a depression time of the button is less than or equal to a predetermined time.

2. The imaging apparatus according to claim 1, wherein the control circuitry is further configured to set a mode to a switching mode, in which switching between two modes of the manual setting mode and an automatic setting mode in which an optimum value is calculated by the control circuitry to set the particular setting value to the optimum value is enabled, for the particular setting item when the depression time of the button exceeds a predetermined time.

3. The imaging apparatus according to claim 2, wherein, in the switching mode,
the control circuitry is further configured to select the setting mode of the particular setting item selected by the button by performing the rotating operation of the second operation interface; and
the control circuitry is further configured to determine the selected setting mode by performing the depressing operation of the second operation interface.

4. The imaging apparatus according to claim 2, wherein, in the manual setting mode, the control circuitry is further configured to change the particular setting value of the particular setting item selected by the button by performing the rotating operation of the second operation interface.

5. The imaging apparatus according to claim 2, wherein, in the manual setting mode, the control circuitry is further configured to switch from the manual setting mode to the automatic setting mode when a speed of the rotating operation of the second operation interface is a predetermined speed or more.

6. The imaging apparatus according to claim 2, further comprising a display displaying information related to the particular setting item, wherein
the control circuitry is further configured to display information corresponding to operations of the first operation interface and the second operation interface on the display.

7. The imaging apparatus according to claim 6, wherein the control circuitry is further configured to superimpose information corresponding to the operation of the first operation interface or the second operation interface on a captured image and display the superimposed information on the display.

8. The imaging apparatus according to claim 1, wherein the second operation interface is arranged on a front face of a main body on which an optical system is disposed, and
the first operation interface is disposed on a side face of the main body.

9. The imaging apparatus according to claim 8, wherein the second operation interface is disposed on a side face side of the front face of the main body where the first operation interface is provided, rather than the optical system.

10. The imaging apparatus according to claim 9, wherein the second operation interface is configured to perform the depressing operation from a front face of the second operation interface.

11. The imaging apparatus according to claim 8, wherein the second operation interface is cylindrical and disposed such that an axial direction of the cylinder is perpendicular to the front face of the main body, and
the second operation interface is rotatable about an axis of the cylinder and configured to be depressed in the axial direction.

12. The imaging apparatus according to claim 1, wherein the setting items include at least one of an iris, a gain, a shutter speed, or a white balance.

13. A control method, performed by processing circuitry, the method comprising:
- adjusting setting items according to operations of a plurality of buttons corresponding to setting items of imaging conditions;
- setting conditions related to the setting items according to operation of a member having a shape configured to perform a rotating operation and a depressing operation; and
  - setting a mode to a manual setting mode in which a particular setting value of a particular setting item corresponding to a button in the first operation interface can be changed by manual operation when a depression time of the button is less than or equal to a predetermined time.

14. A non-transitory computer-readable medium storing a program that when executed by a computer, causes the computer to:
- allow a plurality of buttons corresponding to setting items of imaging conditions to function as a first operation interface configured to adjust the setting items according to an operation of the first operation interface;
- allow a member having a shape configured to perform a rotating operation and a depressing operation to function as a second operation interface setting conditions related to the setting items according to an operation of the second operation interface; and
- set a mode to a manual setting mode in which a particular setting value of a particular setting item corresponding to a button in the first operation interface can be changed by manual operation when a depression time of the button is less than or equal to a predetermined time.

* * * * *